United States Patent
Itsuki (10) Patent No.: US 11,583,368 B2
(45) Date of Patent: Feb. 21, 2023

(54) ORTHODONTIC BRACKET

(71) Applicants: Yasuhiro Itsuki, Tokyo (JP); OKADA MEDICAL SUPPLY CO., LTD., Tokyo (JP)

(72) Inventor: Yasuhiro Itsuki, Tokyo (JP)

(73) Assignees: Yasuhiro Itsuki, Tokyo (JP); OKADA MEDICAL SUPPLY CO., LTD., Tokyo (JP)

(*) Notice: Subject to any disclaimer, the term of this patent is extended or adjusted under 35 U.S.C. 154(b) by 0 days.

(21) Appl. No.: 17/427,919

(22) PCT Filed: Jan. 22, 2020

(86) PCT No.: PCT/JP2020/002074
§ 371 (c)(1),
(2) Date: Aug. 3, 2021

(87) PCT Pub. No.: WO2020/162172
PCT Pub. Date: Aug. 13, 2020

(65) Prior Publication Data
US 2022/0117701 A1    Apr. 21, 2022

(30) Foreign Application Priority Data
Feb. 4, 2019 (JP) .............................. JP2019-018167

(51) Int. Cl.
*A61C 7/30* (2006.01)
*A61C 7/28* (2006.01)

(52) U.S. Cl.
CPC ............... *A61C 7/287* (2013.01); *A61C 7/30* (2013.01); *A61C 2201/007* (2013.01)

(58) Field of Classification Search
CPC ...... A61C 7/287; A61C 7/30; A61C 2201/007
See application file for complete search history.

(56) References Cited

U.S. PATENT DOCUMENTS

| 4,838,787 A | * | 6/1989 | Lerner | ................... | A61C 7/287 |
| | | | | | 433/14 |
| 5,322,435 A | * | 6/1994 | Pletcher | ................. | A61C 7/145 |
| | | | | | 433/10 |

(Continued)

FOREIGN PATENT DOCUMENTS

| BR | 0116894 | 6/2004 |
| BR | MU8600342 | 11/2007 |

(Continued)

OTHER PUBLICATIONS

"Office Action of India Counterpart Application", dated Mar. 10, 2022, p. 1-p. 5.

(Continued)

*Primary Examiner* — Ralph A Lewis
(74) *Attorney, Agent, or Firm* — JCIPRNET (57) ABSTRACT

One aspect of the present invention is a self-ligation type orthodontic bracket which has a simple structure and in which a shutter can be reliably opened and closed, and fixed. The orthodontic bracket is provided with: a bracket body having a slot to which a wire is attached and an introduction port connected to the slot; a shutter provided between the slot and the introduction port to be able to move forward and backward; and a stopper wire which is attached to the bracket body and prevents the shutter from detaching. The stopper wire is elastic. Both end parts of the stopper wire are supported by the bracket body. When the shutter is closed, the central part of the stopper wire is located at a position which blocks the path along which the shutter moves forward and backward.

10 Claims, 10 Drawing Sheets

(56) References Cited

U.S. PATENT DOCUMENTS

| | | | | |
|---|---|---|---|---|
| 5,782,631 | A * | 7/1998 | Kesling | A61C 7/287 433/14 |
| 5,890,893 | A * | 4/1999 | Heiser | A61C 7/287 433/14 |
| 5,908,293 | A * | 6/1999 | Voudouris | A61C 7/02 433/10 |
| 6,217,321 | B1 | 4/2001 | Kanno | |
| 7,419,375 | B2 | 9/2008 | Farzin-Nia et al. | |
| 8,029,276 | B1 * | 10/2011 | Lokar | A61C 7/287 433/10 |
| 9,615,899 | B2 * | 4/2017 | Lopes | A61C 7/287 |
| 2010/0285420 | A1 * | 11/2010 | Oda | A61C 7/30 433/11 |
| 2016/0228217 | A1 | 8/2016 | Choi | |

FOREIGN PATENT DOCUMENTS

| | | |
|---|---|---|
| BR | PI1103406 | 7/2013 |
| BR | 202013007004 | 12/2015 |
| BR | 112013020242 | 10/2016 |
| BR | 112015001571 | 7/2017 |
| CN | 201642385 | 11/2010 |
| JP | 2001503305 | 3/2001 |
| JP | 2001120577 | 5/2001 |
| JP | 2003070808 | 3/2003 |
| JP | 2005058742 | 3/2005 |
| JP | 2011025016 | 2/2011 |
| JP | 2011025070 | 2/2011 |
| JP | 2014512852 | 5/2014 |
| KR | 101506343 | 3/2015 |
| WO | 2018135569 | 7/2018 |

OTHER PUBLICATIONS

"Office Action of Japan Counterpart Application", dated Aug. 3, 2021, with English translation thereof, p. 1-p. 8.

"International Search Report (Form PCT/ISA/210) of PCT/JP2020/002074," dated Mar. 31, 2020, with English translation thereof, pp. 1-4.

"Search Report of Europe Counterpart Application", dated Feb. 23, 2022, p. 1-p. 8.

"Office Action of Europe Counterpart Application, Application No. 20752975.1", dated Jul. 21, 2022, p. 1-p. 6.

Office Action of European Counterpart Application, dated Dec. 8, 2022, pp. 1-4.

* cited by examiner

ORTHODONTIC BRACKET

CROSS-REFERENCE TO RELATED APPLICATION

This application is a 371 application of the international PCT application serial no. PCT/JP2020/002074, filed on Jan. 22, 2020, which claims the priority benefits of Japan application no. 2019-018167, filed on Feb. 4, 2019. The entirety of each of the above-mentioned patent applications is hereby incorporated by reference herein and made a part of this specification.

TECHNICAL FIELD

The present invention relates to a bracket for orthodontics and more particularly to a self-ligation type bracket.

BACKGROUND ART

In orthodontics, teeth are aligned by giving three-dimensional orthodontic forces such as front-back and right-left force, tilting force, and rotational force to one or more of the teeth to be moved. Giving the orthodontic forces to the teeth include fixing brackets to the teeth, attaching a wire or the like between a bracket for a reference tooth and a bracket for a tooth to be moved, and tightening the wire. By adjusting the wire routing, tightening method, etc., the orthodontic forces are applied in the desired directions.

The bracket is provided with a slot for attaching the wire. The wire is ligated by rubber or the like in a state of being attached to the slot and is fixed so as not to be misaligned with respect to the bracket. The types of brackets include a self-ligation type that does not need to be ligated by rubber or the like. This type of bracket is provided with a shutter that can be opened and closed at an opening portion of the slot in which the wire is attached. The shutter is closed in a state in which the wire is attached, thereby to close the opening portion of the slot, thus preventing the wire from detaching. When the shutter is opened, the opening portion is also opened, and the wire can be easily removed and replaced (see, for example, Patent Documents 1 to 4).

Another type of bracket for orthodontics is also proposed, which comprises: a bracket main body having a slot for attaching a wire and an introduction port adjacent to the slot; and a shutter provided between the slot and the introduction port of the bracket main body so as to be movable forward and backward (see, for example, Patent Document 5). The bracket main body has an outer guide wall that forms the slot and the introduction port. The shutter is inserted in a through hole provided in the outer guide wall. The shutter is provided such that when the shutter is closed to cover the slot, the tip portion of the shutter protrudes from the through hole to the slot side and is then displaced in a first direction from the introduction port side toward the slot side.

CITATION LIST

Patent Document

Patent Document 1: JP 2011-025070A
Patent Document 2: JP 2011-025016A
Patent Document 3: Japanese Translation of PCT International Application, No. 2014-512852
Patent Document 4: Japanese Translation of PCT International Application, No. 2001-503305
Patent Document 5: WO 2018/135569

SUMMARY OF INVENTION

Technical Problem

In the brackets for orthodontics, the self-ligation type ones have less frictional force between the wire attached to the slot and the bracket, and the teeth can be moved by a weak orthodontic force. However, unfortunately, the structure of brackets tends to be complicated as disclosed in Patent Document 5. Moreover, in the conventional self-ligation type, the shutter is opened and closed in the attachment/detachment direction of the bracket wire, and the shutter may therefore open if a strong force is applied to the wire. It is thus necessary to arrange and rearrange the brackets with consideration for the force applied to the wire, which may cause complicated treatment.

An object of the present invention is to provide a bracket for orthodontics that allows a shutter to be reliably opened/closed and fixed with a simple structure in the self-ligation type.

Solution to Problem

An aspect of the present invention provides a bracket for orthodontics comprising: a bracket main body having a slot for attaching a wire and an introduction port adjacent to the slot; a shutter provided between the slot and the introduction port so as to be movable forward and backward; and a stopper wire attached to the bracket main body to prevent detachment of the shutter. In this bracket, the stopper wire has elasticity. Both end portions of the stopper wire are held by the bracket main body. The central portion of the stopper wire is disposed at a position that obstructs a path (forward/backward movement path) in an opening direction of the shutter in a state in which the shutter is closed.

According to such a configuration, in the state in which the shutter is closed, the central portion of the stopper wire is disposed at a position that obstructs the path (forward/backward movement path) in the opening direction of the shutter, and the stopper wire can therefore prevent the shutter from opening. Moreover, when the shutter is opened, the central portion is made away from the forward/backward movement path of the shutter against the elasticity of the stop wire, and the shutter can thereby be opened without being interrupted with the stop wire. Furthermore, the forward/backward movement direction of the shutter is approximately orthogonal to the insertion direction of the wire inserted into the slot of the bracket, and the closed shutter therefore does not open even when a strong force is applied to the wire.

In the above bracket, the central portion of the stopper wire may be provided so as to press an end portion of the shutter by the elasticity of the stopper wire. Through this configuration, in the state in which the shutter is closed, the end portion of the shutter can be pressed by the central portion of the stopper wire to keep the shutter closed more firmly.

In the above bracket, the central portion of the stopper wire is preferably provided so as to be out of the forward/backward movement path of the shutter while being in contact with the shutter in a state in which the shutter is opened. Through this configuration, when the shutter is being opened, the central portion of the stopper wire is in contact with the shutter to give some resistance to the operation of the shutter, and the detachment of the shutter from the bracket main body can be suppressed.

In the above bracket, the bracket main body may have an inner guide wall and an outer guide wall that form the slot and the introduction port and face each other, the outer guide wall may have a through hole in which the shutter is inserted, and the shutter may be provided with a detachment prevention device that prevents the shutter from detaching from the through hole when the shutter inserted in the through hole is opened. Through this configuration, when the shutter is opened, detachment of the shutter can be prevented by the detachment prevention device, and the workability can be improved.

Another aspect of the present invention provides a bracket for orthodontics comprising: a bracket main body having a first slot for attaching a first wire, a first introduction port adjacent to the first slot, a second slot for attaching a second wire, and a second introduction port adjacent to the second slot; a first shutter provided between the first slot and the first introduction port so as to be movable forward and backward; a second shutter provided between the second slot and the second introduction port so as to be movable forward and backward; and a stopper wire attached to the bracket main body to prevent detachment of the first shutter and the second shutter. In this bracket, a path (forward/backward movement path) in an opening direction of the first shutter and a path (forward/backward movement path) in an opening direction of the second shutter are provided so as to cross each other in a crossing area. The stopper wire has elasticity. Both end portions of the stopper wire are held by the bracket main body. The central portion of the stopper wire is disposed in the crossing area in a state in which the first shutter and second shutter are closed.

According to such a configuration, in the bracket in which the two wires of the first wire and the second wire can be attached to the bracket main body, the central portion of the stopper wire is disposed in the crossing area in which respective opening directions of the first shutter and the second shutter cross each other, and one stopper wire can therefore prevent the two shutters of the first shutter and the second shutter from opening. Moreover, when the first shutter and the second shutter are opened, the central portion is made away from the crossing area against the elasticity of the stop wire, and the first shutter and the second shutter can thereby be opened without being interrupted with the stop wire.

Advantageous Effects of Invention

According to the present invention, there can be provided a bracket for orthodontics that allows the shutter or shutters to be reliably opened/closed and fixed with a simple structure in the self-ligation type.

DESCRIPTION OF EMBODIMENTS

Hereinafter, one or more embodiments of the present invention will be described with reference to the drawings. In the following description, the same members are denoted by the same reference numerals and the description of members once explained may be omitted.

(Configuration of Bracket)

Figure 1:
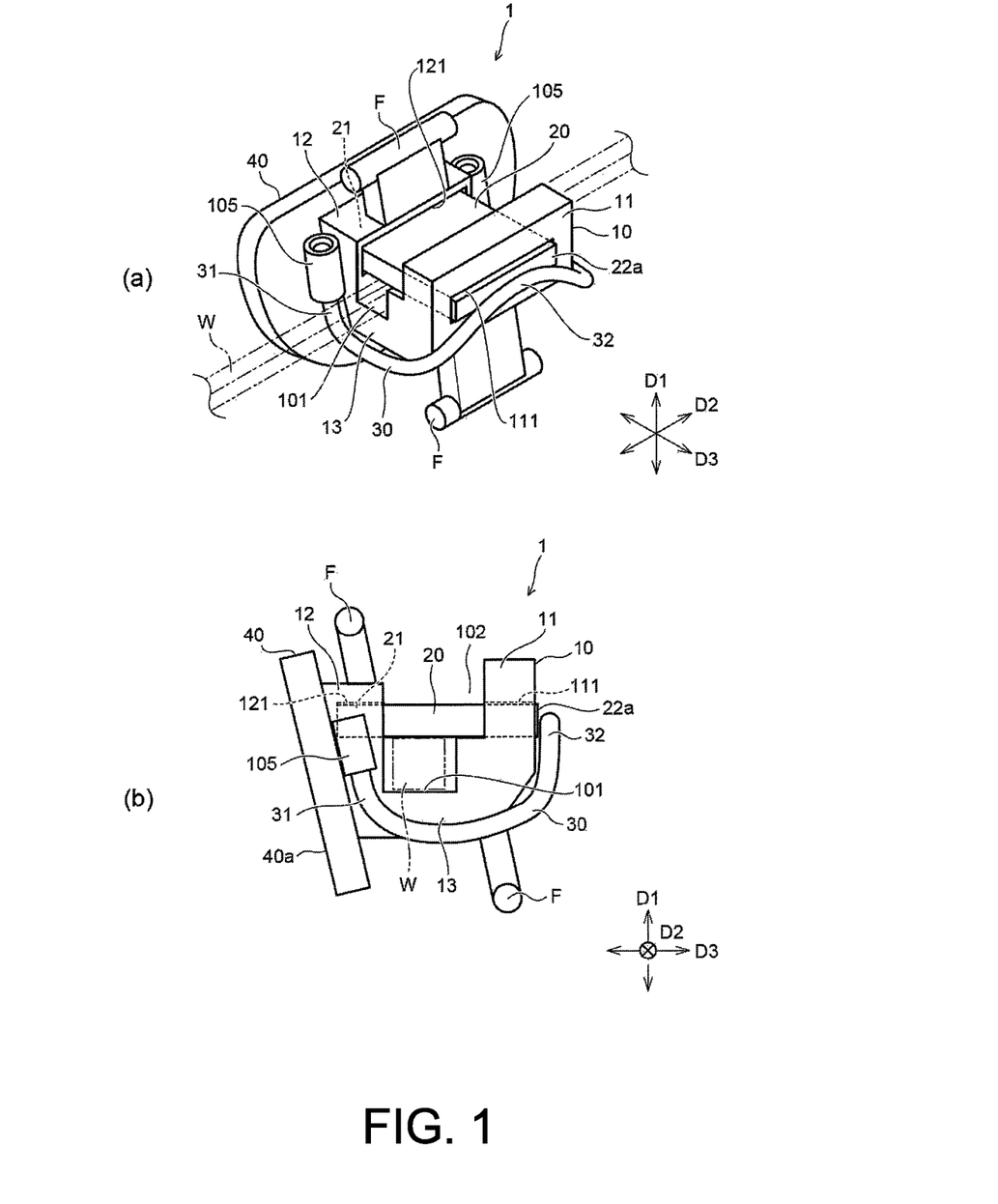
In FIG. 1, (a) and (b) are schematic views for exemplifying the configuration of a bracket according to an embodiment of the present invention.

In FIG. 1, (a) and (b) are schematic views for exemplifying the configuration of a bracket according to an embodiment of the present invention.

(a) of FIG. 1 illustrates a perspective view of a bracket 1, and (b) of FIG. 1 illustrates a side view of the bracket 1.

The bracket 1 according to the present embodiment is an appliance for orthodontics that is attached to the front side or back side (lingual side) of a tooth. A wire W for applying an orthodontic force to the tooth is attached to the bracket 1. The bracket 1 according to the present embodiment is of a self-ligation type in which the wire W can be fixed to the bracket 1 without using a ligature tool such as rubber.

The bracket 1 includes a bracket main body 10, a shutter 20, and a stopper wire 30. The bracket main body 10 has a slot 101 for attaching the wire W and an introduction port 102 adjacent to the slot 101.

In the present embodiment, for descriptive purposes, the direction connecting the slot 101 and the introduction port 102 (also referred to as the depth direction of the slot 101) will be referred to as a first direction D1, one of directions orthogonal to the first direction D1 (also referred to as the length direction of the slot 101) will be referred to as a second direction D2, and the direction orthogonal to the first direction D1 and the second direction D2 (also referred to as the width direction of the slot 101) will be referred to as a third direction D3.

The bracket main body 10 has an outer guide wall 11 that forms the slot 101 and the introduction port 102 and an inner guide wall 12 that faces the outer guide wall 11. The slot 101 and the introduction port 102 are provided between the outer guide wall 11 and the inner guide wall 12. The cross-sectional shape of the slot 101 as seen in the second direction D2 is, for example, a rectangle. To form the bottom of the slot 101, a bottom portion 13 is provided between the outer guide wall 11 and the inner guide wall 12.

The direction of the introduction port 102 which communicates with the slot 101 (the direction on the opening side) is preferably set so as to face the tip side of a tooth when the bracket 1 is attached to the tooth. For example, when the bracket 1 is attached to the back side (lingual side) of a tooth, the introduction port 102 faces the tip side of the tooth, and it is thereby easy to ensure a space when fitting the wire W into the slot 101. When the wire W is fitted from the tip side of a tooth, the wire W is less likely to be affected by the dentition, and the wire W can be easily inserted into the slot 101. The direction of the introduction port 102 may be a direction orthogonal to the extending direction of a tooth.

The outer guide wall 11 and/or the inner guide wall 12 may be provided with a hook F as necessary. Even in the self-ligation type bracket 1, a ligature tool such as rubber may be fitted on the hook F, or rubber or other materials may be attached to the hook F in order to give an orthodontic force from other than the wire W.

The bracket 1 may include a base portion 40. The base portion 40 is a member for fixing the bracket main body 10 to a tooth at a predetermined angle. An attachment surface 40a to a tooth is provided on one side of the base portion 40 (in (b) of FIG. 1, on the left side in the direction D3). The bracket main body 10 is provided on the other side of the base portion 40 (in (b) of FIG. 1, on the right side in the direction D3). The attachment surface 40a of the base portion 40 is provided at an arbitrary angle with respect to the first direction D1. This allows the bracket 1 to be disposed such that the depth direction (first direction D0 of the slot 101 is in a desired direction (vertical direction or the like) when the bracket 1 is attached to a tooth.

For the bracket 1, a titanium-based material such as pure titanium or a titanium alloy, a stainless alloy, or other similar material, for example, is used as a material excellent in the biocompatibility. The bracket main body 10 and the base portion 40 may be integrally provided using such a material or may otherwise be separated and connected to each other at a predetermined angle.

The shutter 20 is provided between the slot 101 and the introduction port 102 of the bracket main body 10 so as to be movable forward and backward. That is, the shutter 20 is inserted in a through hole 111 provided in the outer guide wall 11 and can be taken in and out through the through hole 111. When the shutter 20 is closed to cover the slot 101, a tip portion 21 of the shutter 20 protrudes from the through hole 111 to the slot 101 side and is then fitted into a recessed portion 121 provided in the inner guide wall 12. The forward/backward movement direction of the shutter 20 is the third direction D3 and is orthogonal to the first direction D1 which is the direction of inserting the wire W into the slot 101. Therefore, even when a strong force is applied to the wire W in a state in which the wire W is inserted in the slot 101 and the shutter 20 is closed, the closed shutter 20 does not open.

The stopper wire 30 is a wire member having elasticity. The stopper wire 30 is provided by causing curvatures in a wire member to have a predetermined shape. It is preferred to use a shape memory alloy having excellent elasticity for the stopper wire 30. This allows the stopper wire 30 to have sufficient elasticity. Moreover, even if deformation occurs in the stopper wire 30 when it is attached, the shape of the stopper wire 30 is restored by the temperature in the oral cavity after attaching the stopper wire 30, and reliable attachment can be performed.

The stopper wire 30 is provided by causing curvatures from both end portions 31 to a central portion 32 so as to avoid the wire W. For example, the stopper wire 30 is provided so that it is curved from the both end portions 31 via beneath the wire W and curved again upward and the central portion 32 is located in the vicinity of a rear end 22a of the shutter 20.

The both end portions 31 of the stopper wire 30 are inserted or fitted into tubular parts 105 provided on the bracket main body 10 and are fixed to the bracket main body 10. The central portion 32 of the stopper wire 30 is disposed at a position that obstructs a path (also referred to as a "forward/backward movement path," hereinafter) in the opening direction of the shutter 20 in a state in which the shutter 20 is closed. Through this configuration, in the state in which the shutter 20 is closed, the central portion 32 of the stopper wire 30 serves as a stopper for the shutter 20 and prevents the shutter 20 from dropping off.

The central portion 32 of the stopper wire 30 may be provided so as to press the rear end 22a of the shutter 20 by the elasticity of the stopper wire 30. This allows the central portion 32 of the stopper wire 30 to press the rear end 22a of the shutter 20 in the state in which the shutter 20 is closed, and the shutter 20 can be kept closed more firmly.

When a shape memory alloy is used as the stopper wire 30, it may be set as below. That is, the shape of the stopper wire 30 is preliminarily deformed so that the central portion 32 is away from the rear end 22a, and after the shutter 20 is closed, the shape of the stopper wire 30 is restored by the temperature in the oral cavity and the central portion 32 presses the rear end 22a.

(Operation of Shutter)

The operation of the shutter 20 will then be described.

Figure 2:
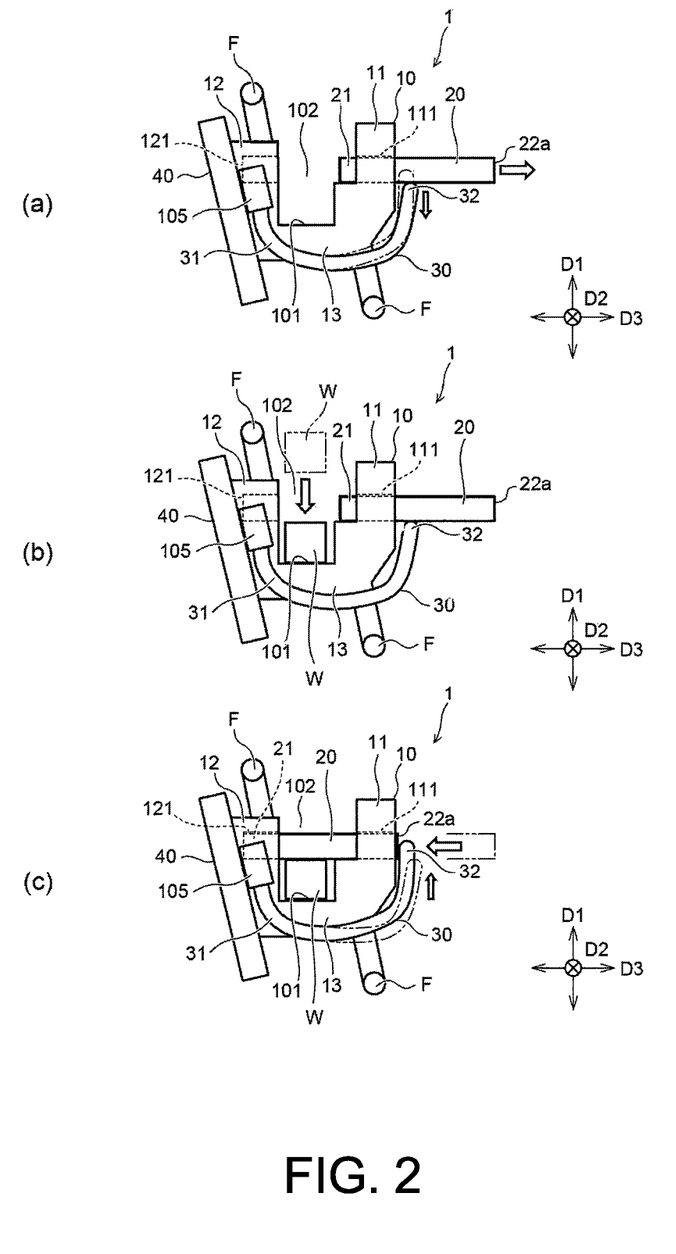
In FIG. 2, (a) to (c) are side views for describing the operation of a shutter.

In FIG. 2, (a) to (c) are side views for describing the operation of the shutter.

First, as illustrated in (a) of FIG. 2, the shutter 20 is opened. When opening the shutter 20, the central portion 32 of the stopper wire 30 is pushed down to be made away from the forward/backward movement path of the shutter 20. The central portion 32 is located in the vicinity of the rear end 22a of the shutter 20 by the elastic force of the stopper wire 30 and can therefore be made away from the forward/backward movement path by being pushed down against the elastic force. When the central portion 32 is made away from the forward/backward movement path, the stopper function is released and the shutter 20 can be opened.

As the shutter 20 is opened beyond the position of the central portion 32, the central portion 32 being pushed down will return to the original position due to the elastic force of the stopper wire 30. Therefore, the central portion 32 comes into a state of being in contact with the lower surface of the shutter 20 in mid-course of opening. This contact of the central portion 32 gives moderate resistance to the operation of the shutter 20. This allows a sense of stability to be obtained in the operation of the shutter 20, and it is possible to prevent the shutter 20 from being easily detached from the bracket main body 10.

As illustrated in (b) of FIG. 2, the wire W is then inserted into the slot 101 from the introduction port 102 in a state in which the shutter 20 is opened and the slot 101 and the introduction port 102 communicate with each other.

As illustrated in (c) of FIG. 2, the shutter 20 is then closed. Also, when the shutter 20 is being closed, the central portion 32 is in contact with the lower surface of the shutter 20, and it is therefore possible to give moderate resistance and a sense of stability to the operation of the shutter 20. As the shutter 20 is closed, the tip portion 21 of the shutter 20 fits into the recessed portion 121 of the inner guide wall 12. Then, when the rear end 22a of the shutter 20 moves beyond the position of the central portion 32 of the stopper wire 30, the central portion 32 is pushed up by the elastic force of the stopper wire 30 and returns to the original position. This allows the stopper function of the central portion 32 to be restored, and the shutter 20 can be fixed in the closed state.

Thus, in the bracket 1 according to the present embodiment, the shutter 20 can be opened and closed by a simple operation such as sliding the shutter 20 through the through hole 111 to insert and release the tip portion 21 into and from the recessed portion 121. Moreover, the stopper wire 30 can fix the shutter 20 and give moderate resistance and a sense of stability during the opening/closing operation and can suppress the detachment of the shutter 20. Furthermore, the closed shutter 20 does not open even when a strong force is applied to the wire W in a state in which the wire W is inserted and the shutter 20 is closed because the forward/backward movement direction of the shutter 20 (third direction D3) is orthogonal to the insertion direction of the wire W inserted into the slot 101 (first direction D1). Therefore, it is not necessary to arrange or rearrange the brackets 1 with a concern that the shutter 20 may be opened due to the force applied to the wire W, and it is possible to reduce the treatment time and the burden on a patient.

(Examples of Detachment Prevention Device)

The detachment prevention device will then be described.

Figure 3:
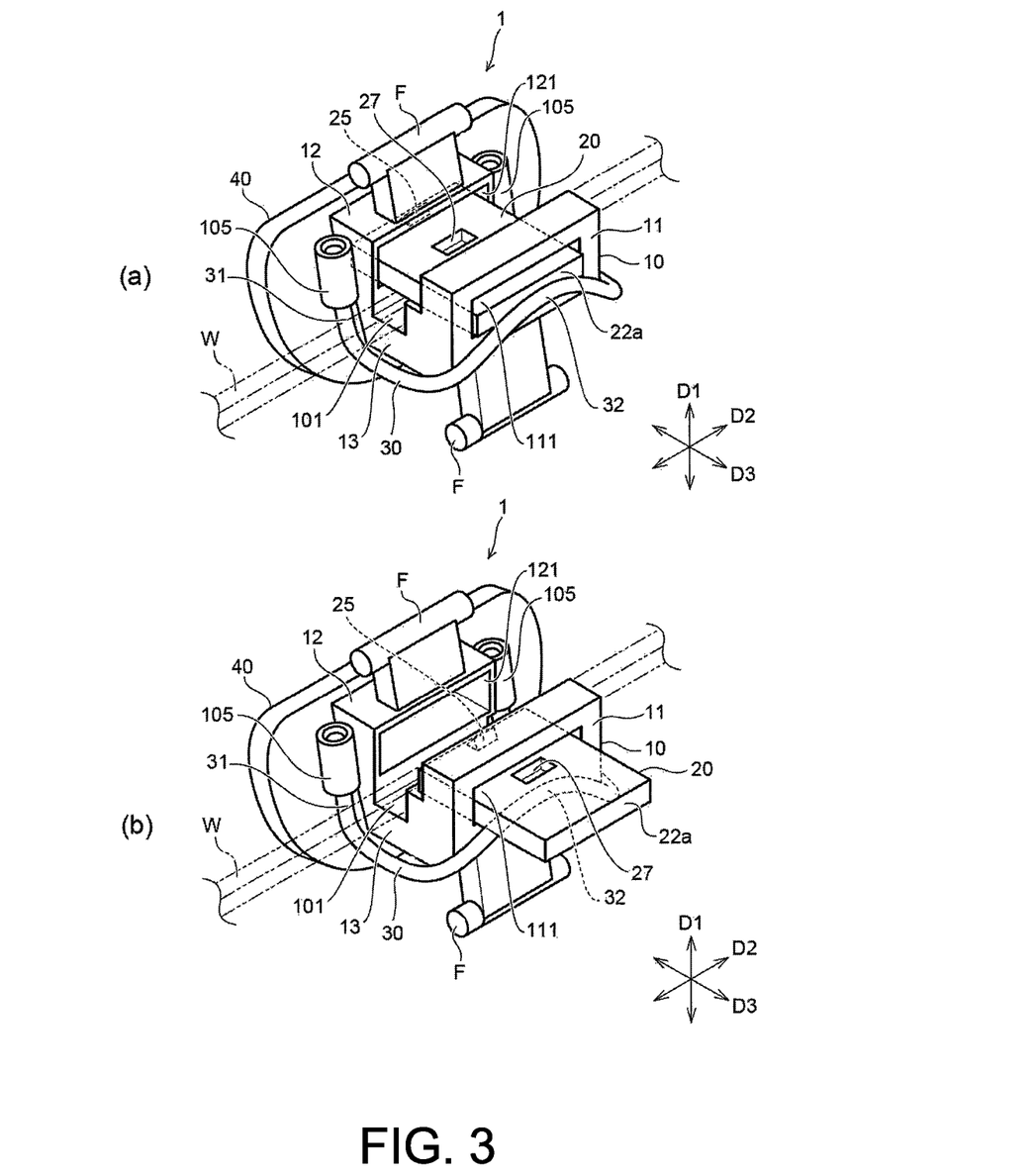
In FIG. 3, (a) and (b) are perspective views illustrating an example of a detachment prevention device.

In FIG. 3, (a) and (b) are perspective views illustrating an example of a detachment prevention device.

(a) of FIG. 3 illustrates a state in which the shutter 20 is closed, and (b) of FIG. 3 illustrates a state in which the shutter 20 is opened.

Figure 4:
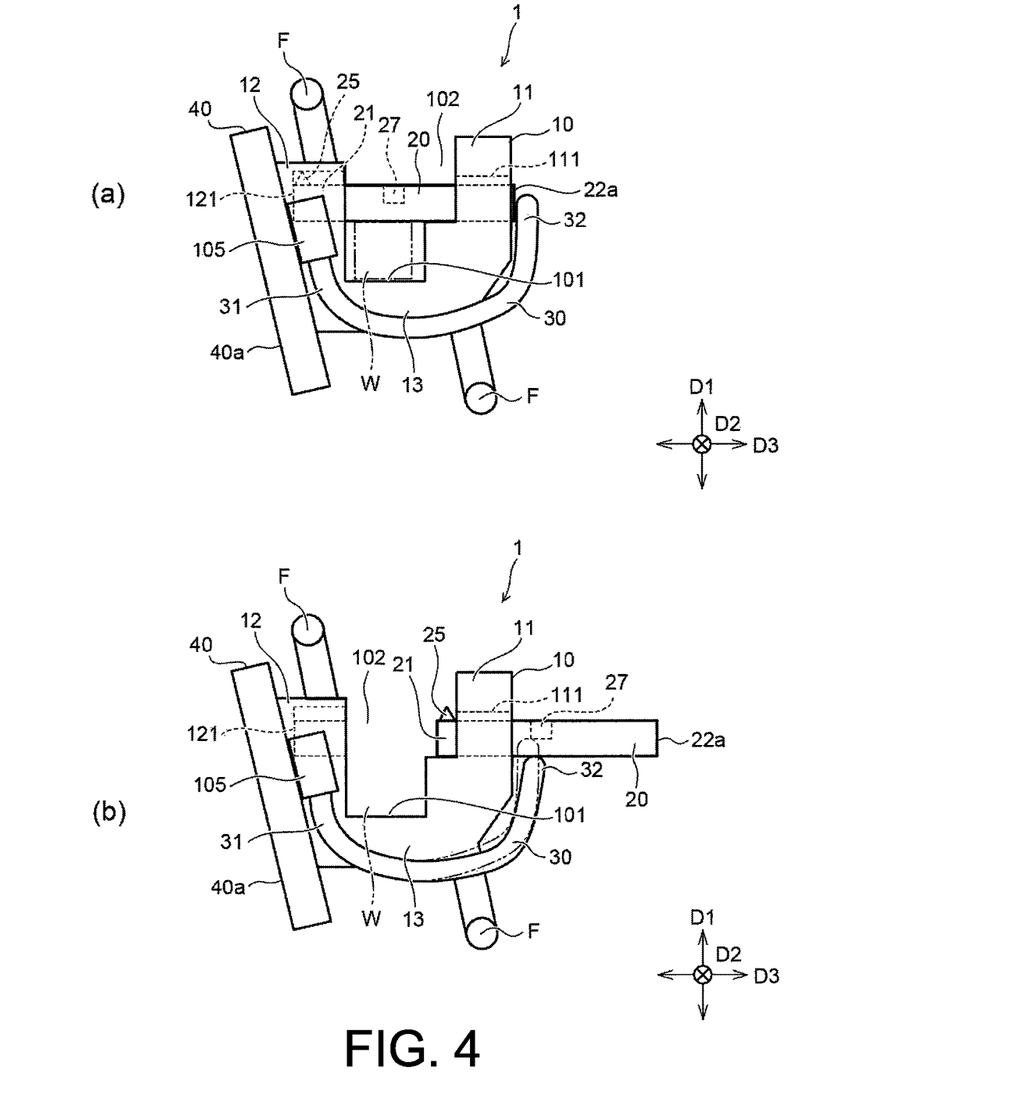
In FIG. 4, (a) and (b) are side views illustrating the example of the detachment prevention device.

In FIG. 4, (a) and (b) are side views illustrating the example of the detachment prevention device.

(a) of FIG. 4 illustrates the state in which the shutter 20 is closed, and (b) of FIG. 4 illustrates the state in which the shutter 20 is opened.

In the present embodiment, a protruding portion 25 is used as the detachment prevention device. The protruding portion 25 is provided as a part of the tip portion 21 of the shutter 20 and serves to prevent the shutter 20 from detaching from the through hole 111 when the shutter 20 inserted in the through hole 111 is opened. For example, the protruding portion 25 is provided in a triangular prism shape extending in the second direction D2.

The opening size of the through hole 111 is set such that when the shutter 20 is inserted into the through hole 111, the shutter 20 including the protruding portion 25 can be inserted. This allows the shutter 20 to be inserted into the through hole 111 even though the protruding portion 25 is provided as a part of the tip portion 21 of the shutter 20.

The size of the recessed portion 121 of the inner guide wall 12 is also set such that the shutter 20 including the protruding portion 25 can be inserted into the recessed portion 121. This allows the shutter 20 to be inserted into the recessed portion 121 even though the protruding portion 25 is provided as a part of the tip portion 21 of the shutter 20.

After the shutter 20 is inserted until the protruding portion 25 passes through the through hole 111, pressure is applied to the outer guide wall 11 to slightly squeeze the through hole 111. In this operation, the opening size of the through hole 111 is set to such an extent that the shutter 20 can move forward and backward but the protruding portion 25 cannot pass through. Through this configuration, the forward/backward movement of the shutter 20 inserted in the through hole 111 is not hindered, and as the shutter 20 is opened, the protruding portion 25 is caught at the position of the through hole 111 to prevent the shutter 20 from being further opened, and the detachment of the shutter 20 can thus be prevented.

Here, a recessed portion 27 may be provided at the surface of the shutter 20 on the introduction port 102 side. By hooking, for example, the tip of a pick in the recessed portion 27, the opening/closing operation of the shutter 20 can be easily performed. In particular, in the shutter 20 provided with the protruding portion 25, the detachment of the shutter 20 is prevented when it is opened; therefore, even when the tip of a pick is hooked in the recessed portion 27 and pulled strongly, this operation can be performed without worrying about the detachment of the shutter 20.

The shape of the protruding portion 25 described above is not limited to the triangular prism shape, and may be another shape such as a square prism shape or a hemispherical shape.

The length of the protruding portion 25 in the second direction D2 may be equivalent to the length of the shutter 20 in the second direction D2. This allows the shutter 20 to be stably fitted when the tip portion 21 of the shutter 20 including the protruding portion 25 is inserted into the recessed portion 121.

The opening size of the recessed portion 121 may not necessarily have to be a size that allows the shutter 20 including the protruding portion 25 to be inserted. For example, if the protruding portion 25 is provided slightly closer to the center of the shutter 20 from its tip, a portion closer to the tip side from the protruding portion 25 can be inserted into the recessed portion 121. In this case, it suffices that the opening size of the recessed portion 121 allows only the tip portion 21 of the shutter 20 to be inserted into the recessed portion 121.

As a method of preventing the detachment of the shutter 20, the method of applying pressure to the outer guide wall 11 to slightly squeeze the through hole 111 has been described above, but the method is not limited to this.

Figure 5:
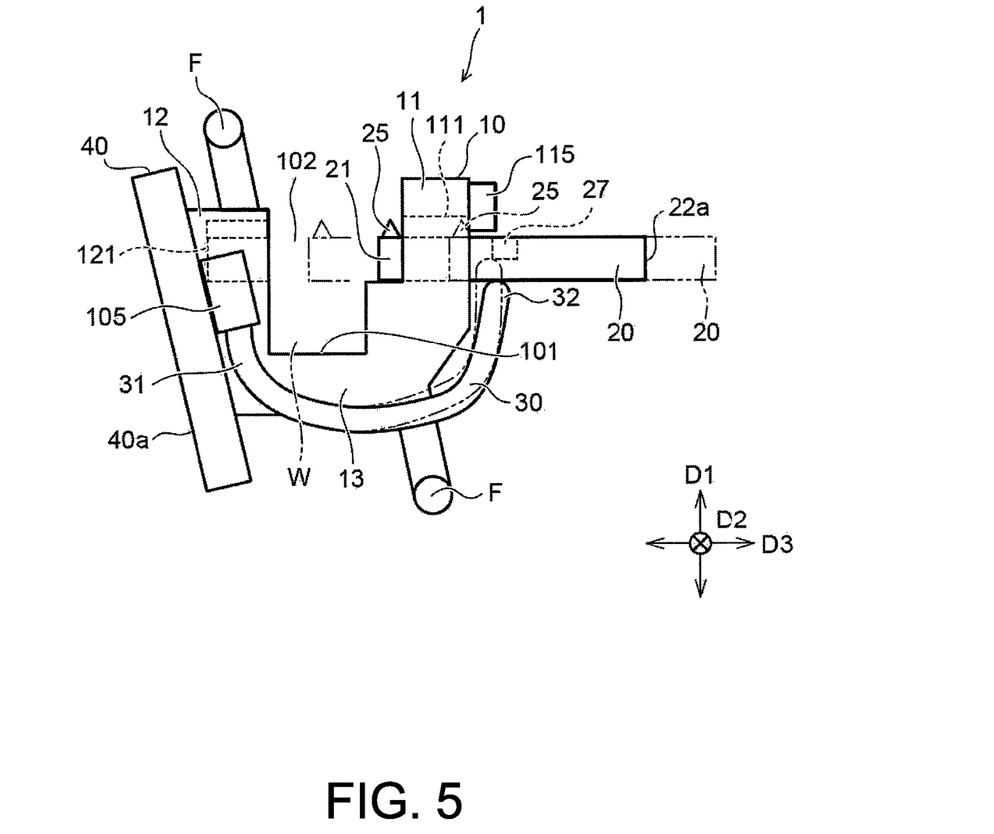
FIG. 5 is a side view illustrating an example of another detachment prevention device.

FIG. 5 is a side view illustrating an example of another detachment prevention device.

As in the specific example illustrated in FIG. 5, a member (stop member 115) that closes a part of the through hole 111 may be attached to the end portion of the outer guide wall 11 in the third direction D3. An example of a method of attaching the stop member 115 is electric welding. After the shutter 20 is inserted into the through hole 111, the stop member 115 is attached so as to close a part of the through hole 111. This allows the shutter 20 to be opened until the protruding portion 25 of the shutter 20 comes into contact with the stop member 115 as the shutter 20 is opened, and the shutter 20 cannot be further opened to the outside.

Figure 6:
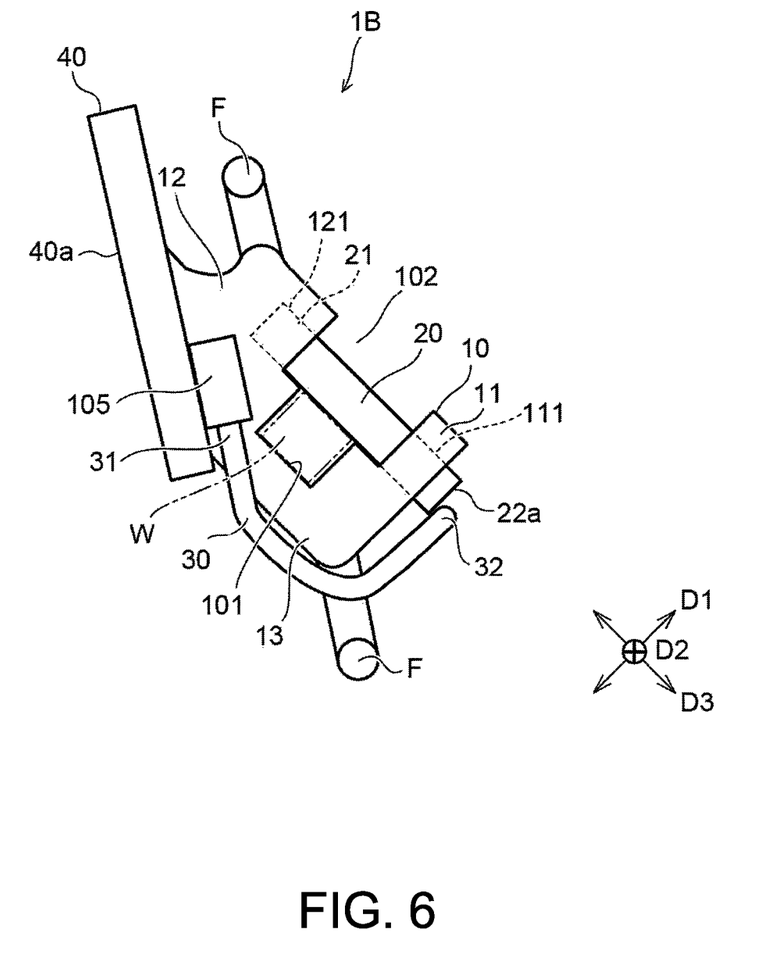
FIG. 6 is a side view for exemplifying another type of bracket.

FIG. 6 is a side view for exemplifying another type of bracket.

This bracket 1B is applied, for example, to a maxillary anterior tooth and has an acute angle of the opening/closing direction of the shutter 20 with respect to the base portion 40 as compared with the previously described bracket 1 (FIG. 1 and FIG. 2). When the bracket 1B is used, therefore, the wire W can be inserted from the occlusal surface side (lingual side), that is, from the first direction D1 in FIG. 6, and insertion of the wire W is easy. On the other hand, in the case of the bracket having a structure according to the prior art, the wire W has to be inserted into the slot 101 from the third direction D3 in FIG. 6. This means that the wire W is inserted from the cervix dentis side, and the workability is extremely low.

On the other hand, when the wire W is inserted for a mandibular bicuspid tooth from the lingual side, for example, insertion of the wire W becomes easy by using the bracket 1 illustrated in FIG. 1 and FIG. 2.

In addition to the above, by preliminarily preparing some types of brackets having different angles of the opening/closing direction of the shutter 20 with respect to the base portion 40, or by preparing a custom-made bracket, the opening/closing operation of the shutter 20 can be easily performed corresponding to the shapes of various teeth, and it is possible to configure a bracket into which the wire W can be inserted perpendicularly.

(Bracket Adopted to Two Wires)

Figure 7:
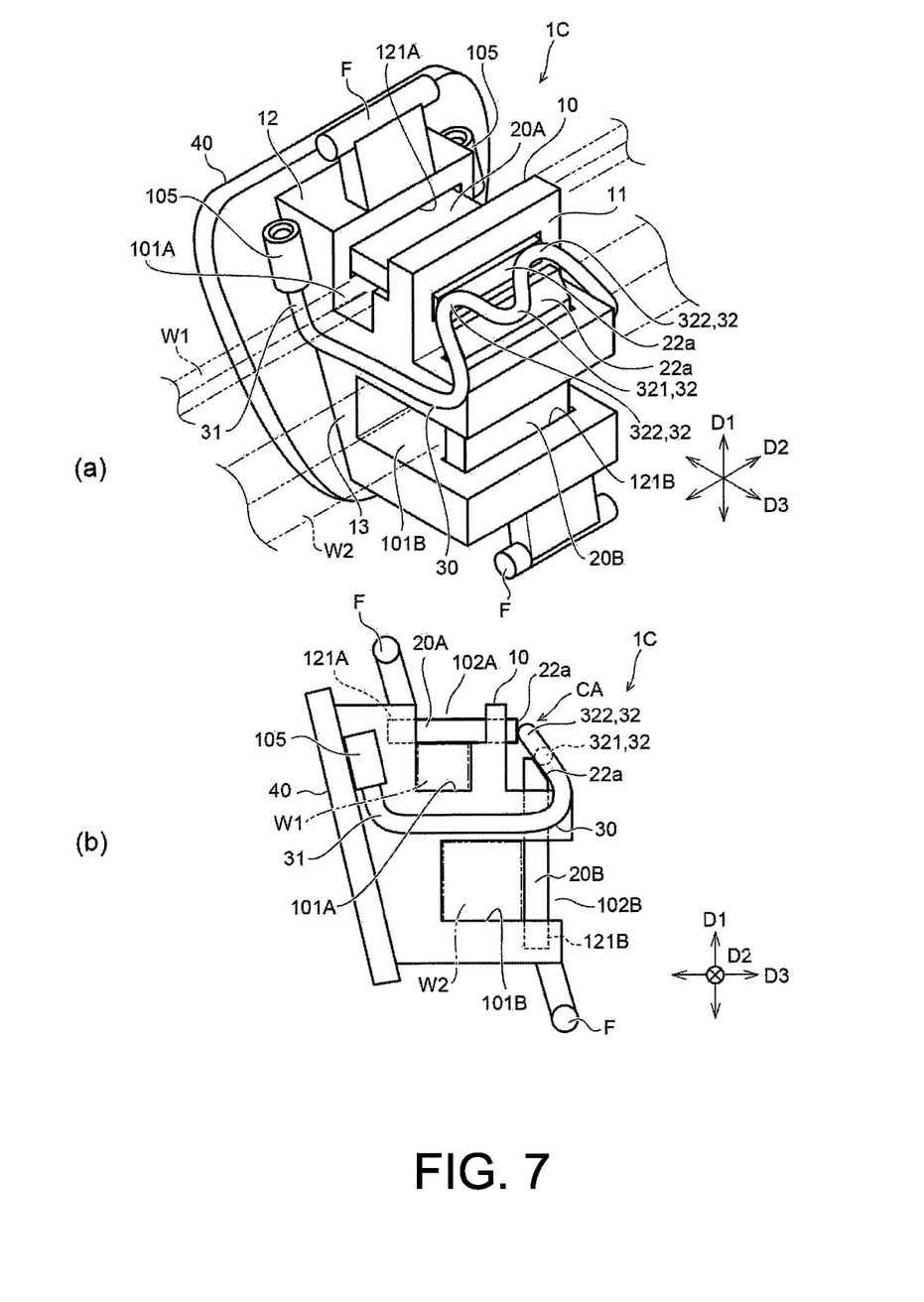
In FIG. 7, (a) and (b) are views for exemplifying a bracket adopted to two wires.

In FIG. 7, (a) and (b) are views for exemplifying a bracket adopted to two wires.

(a) of FIG. 7 illustrates a perspective view of a bracket 1C, and (b) of FIG. 7 illustrates a side view of the bracket 1C.

This bracket 1C has two or more slots. In the example illustrated in FIG. 7, two slots of a first slot 101A and a second slot 101B are provided. The depth direction of the first slot 101A is the first direction D1, and the depth direction of the second slot 101B is the third direction D3.

The first slot 101A is adjacent to a first introduction port 102A, and the second slot 101B is adjacent to a second introduction port 102B. A first shutter 20A is provided between the first slot 101A and the first introduction port 102A in an openable and closable manner, and a second shutter 20B is provided between the second slot 101B and the second introduction port 102B also in an openable and closable manner.

The first shutter 20A is operated to open and close in the third direction D3, and the second shutter 20B is operated to open and close in the first direction D1. Through this configuration, the path (forward/backward movement path) in the opening direction of the first shutter 20A and the path (forward/backward movement path) in the opening direction of the second shutter 20B cross each other in a crossing area CA.

In the bracket 1C, both end portions 31 of the stopper wire 30 are inserted or fitted into the tubular portions 105 and are thereby held on the bracket main body 10. A first central portion 321 and second central portions 322 of the stopper wire 30 are disposed in the crossing area CA in a state in which the first shutter 20A and the second shutter 20B are closed.

The stopper wire 30 is provided by causing curvatures from the both end portions 31 to the central portions so as not to interfere with the first wire W1 or the second wire W2. Specifically, the central portions of the stopper wire 30 are provided with curved portions in an approximately M shape when viewed in the third direction D3. That is, the central portion 32 of the stopper wire 30 has one first central portion 321 having a convex shape and two second central portions 322 having convex shapes and provided on both sides of the first central portion 321.

The first central portion 321 of the stopper wire 30 is curved so as to be convex toward a rear end 22a of the second shutter 20B, and the second central portions 322 are curved so as to be convex toward the opposite side to the first central portion 321, that is, toward a rear end 22a of the first shutter 20A.

This allows the stopper wire 30 to hold the rear end 22a of the second shutter 20B with the first central portion 321, which is one convex shape, and hold the rear end 22a of the first shutter 20A with the second central portions 322, which are two convex shapes. The rear end 22a of the second shutter 20B with which the first central portion 321 comes into contact is preferably processed into a surface inclined at a predetermined angle in order to easily receive the elastic force (pushing force) from the first central portion 321.

In such a bracket 1C, a first wire W1 can be attached to the first slot 101A, and a second wire W2 can be attached to the second slot 101B. Thus, two or more wires can reliably give the orthodontic force to a tooth. In particular, the bracket 1C is effective when it is attached to a molar tooth to give the orthodontic force to the molar tooth.

When the bracket 1C is fixed to a tooth, the opening of the first slot 101A faces the tip side of the tooth, and the opening of the second slot 101B faces the front side or back side of the tooth. That is, the insertion directions of the first wire W1 and the second wire W2 into the slots are orthogonal to each other. Accordingly, the opening/closing directions of the first shutter 20A and the second shutter 20B are also orthogonal to each other. Even when the positions of the first slot 101A and the second slot 101B are close to each other, one of the shutters can be opened and closed as long as the other shutter is closed.

In the bracket 1C, the first central portion 321 and second central portions 322 of the stopper wire 30 are disposed in the crossing area CA in a state in which the first shutter 20A and the second shutter 20B are closed. Therefore, the two shutters of the first shutter 20A and the second shutter 20B can be reliably fixed by one stopper wire 30.

The operation of the first shutter 20A and second shutter 20B in the bracket 1C will then be described.

Figure 8:
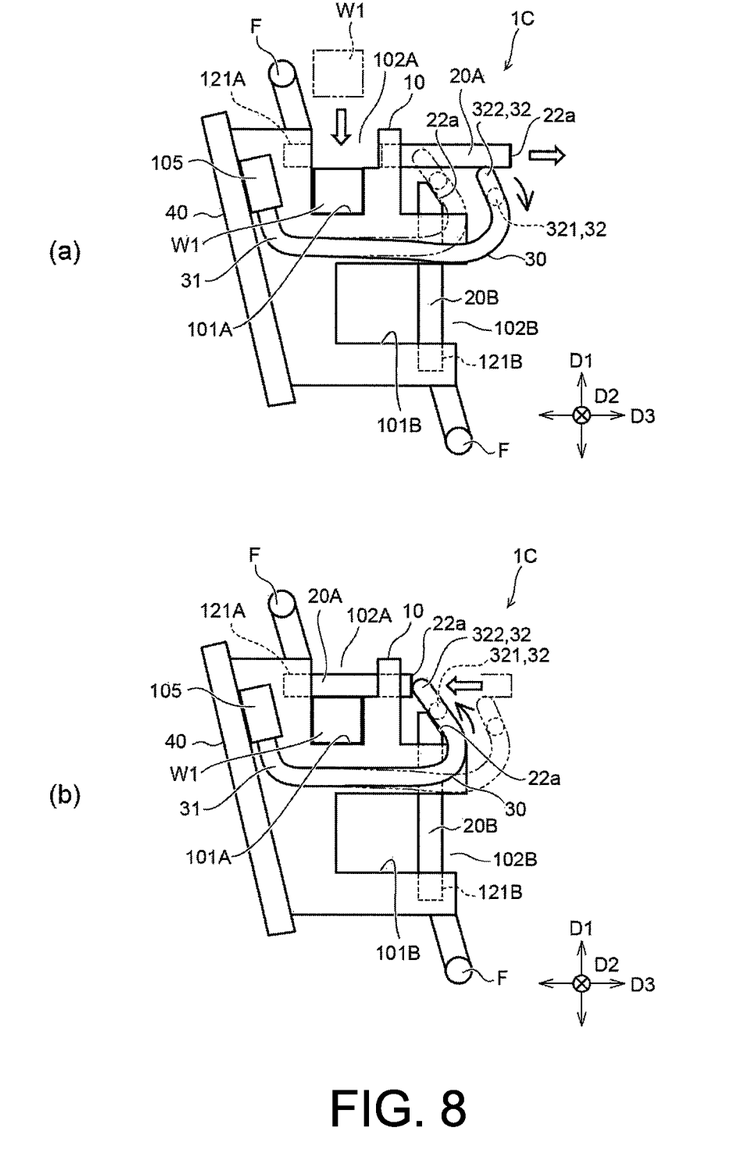
In FIG. 8, (a) and (b) are side views for exemplifying the operation of two shutters.
Figure 9:
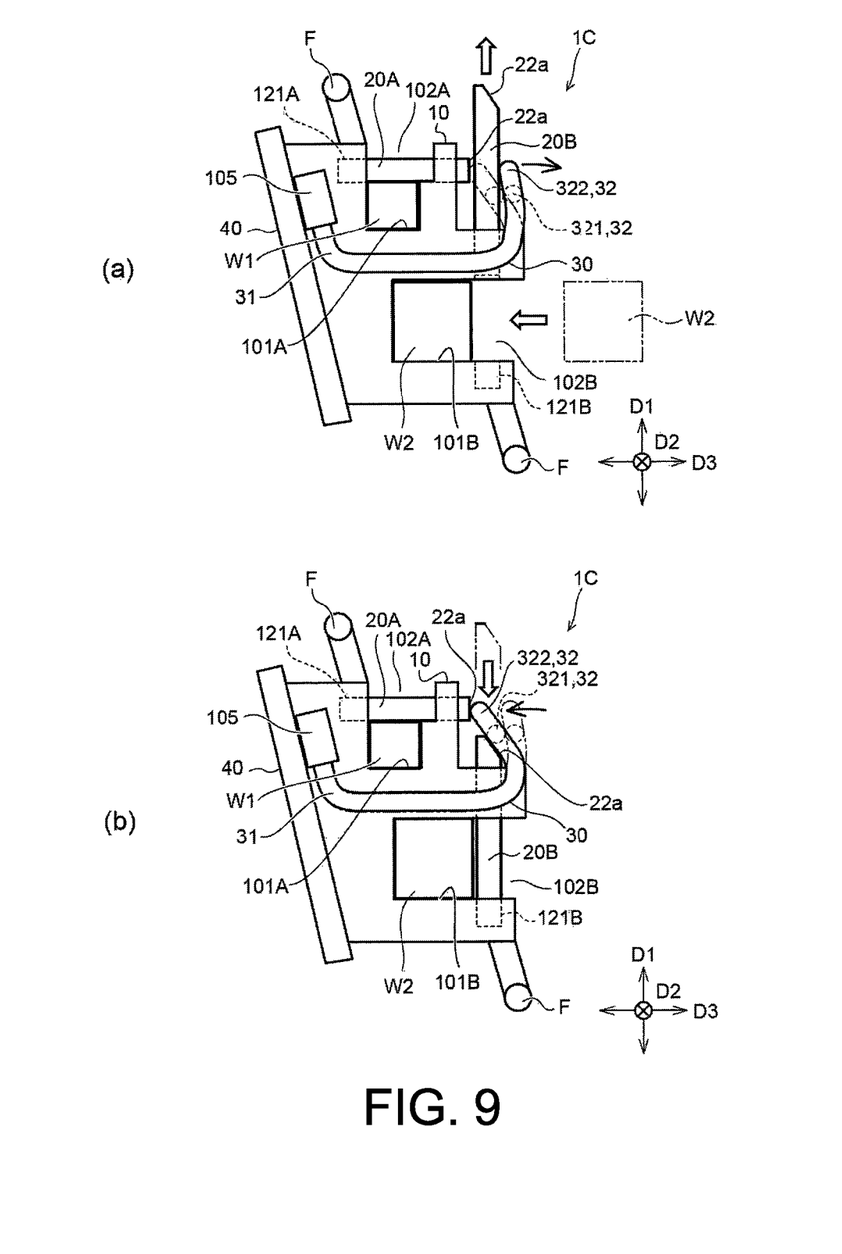
In FIG. 9, (a) and (b) are side views for exemplifying the operation of two shutters.

(a) of FIG. 8 to (b) of FIG. 9 are side views for exemplifying the operation of the two shutters.

First, as illustrated in (a) of FIG. 8, the first shutter 20A is opened. When the first shutter 20A is opened, the first central portion 321 and second central portions 322 of the stopper wire 30 are pushed down to be made away from the forward/backward movement path of the first shutter 20A. When the second central portions 322 are made away from the forward/backward movement path, the stopper function is released and the first shutter 20A can be opened.

When the first shutter 20A is opened, the second central portions 322 come into contact with the lower surface of the first shutter 20A, and it is therefore possible to give moderate resistance and a sense of stability to the operation of the first shutter 20A. In the state in which the first shutter 20A is opened, the first wire W1 is inserted into the first slot 101A from the first introduction port 102A. In the stopper wire 30, portions provided with the first central portion 321 and the second central portions 322 have undergone a curving process, and these portions are therefore relatively hard as compared with portions that have not undergone the curving process, such as portions (straight portions) between the both end portions 31 and those portions. Therefore, as the first shutter 20A is opened, the relatively soft straight portions can be preferentially deformed. Thus, by adjusting the positions of the curved portions of the stopper wire 30, it is possible to lead the sites, at which the stopper wire 30 is bent when the shutter (first shutter 20A, second shutter 20B) is opened, to predetermined sites.

Then, as illustrated in (b) of FIG. 8, the first shutter 20A is closed. As the first shutter 20A is closed, the tip portion 21 of the first shutter 20A fits into the first recessed portion 121A. Then, when the rear end 22a of the first shutter 20A moves beyond the positions of the second central portions 322 of the stopper wire 30, the first central portion 321 and the second central portions 322 are pushed up by the elastic force of the stopper wire 30 and return to the original positions. This allows the stopper function of the second central portions 322 to be restored, and the first shutter 20A can be fixed in the closed state.

Then, as illustrated in (a) of FIG. 9, the second shutter 20B is opened. When the second shutter 20B is opened, the first central portion 321 and second central portions 322 of the stopper wire 30 are pulled so as to open in the third direction D3 and are thereby made away from the forward/backward movement path of the second shutter 20B. When the first central portion 321 is made away from the forward/backward movement path, the stopper function is released and the second shutter 20B can be opened.

When the second shutter 20B is opened, the second central portions 322 come into contact with the lower surface of the second shutter 20B, and it is therefore possible to give moderate resistance and a sense of stability to the operation of the second shutter 20B. In the state in which the second shutter 20B is opened, the second wire W2 is inserted into the second slot 101B from the second introduction port 102B.

Then, as illustrated in (b) of FIG. 9, the second shutter 20B is closed. As the second shutter 20B is closed, the tip portion 21 of the second shutter 20B fits into the second recessed portion 121B. Then, when the rear end 22a of the second shutter 20B moves beyond the position of the first central portion 322 of the stopper wire 30, the first central portion 321 and the second central portions 322 are closed by the elastic force of the stopper wire 30 and return to the original positions. This allows the stopper function of the first central portion 321 to be restored, and the second shutter 20B can be fixed in the closed state.

Thus, even in the configuration in which the first shutter 20A and the second shutter 20B are fixed by one stopper wire 30, one of the first shutter 20A and the second shutter 20B can be opened and closed without being interrupted with the other by separately opening and closing each of the first shutter 20A and the second shutter 20B.

(Example of Separate Base Portion)

Figure 10:
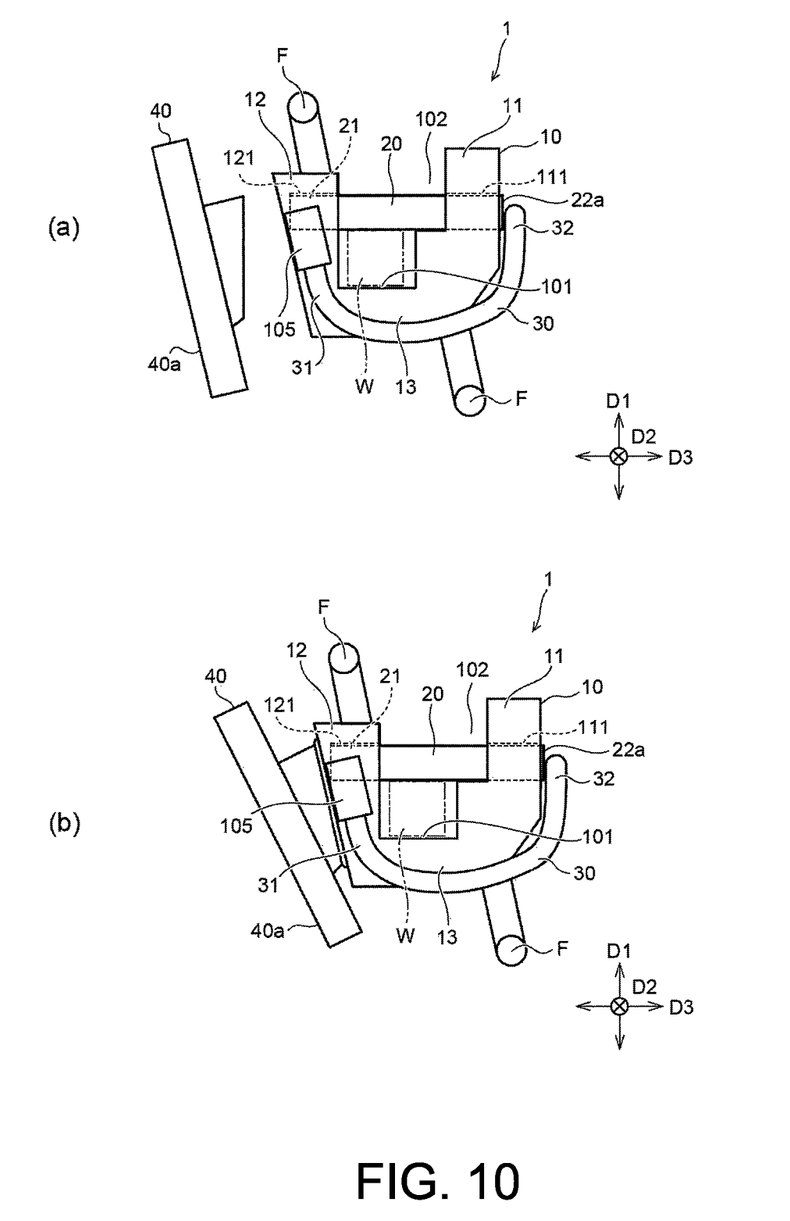
In FIG. 10, (a) and (b) are side views illustrating an example in which a bracket main body and a base portion are separately provided.

In FIG. 10, (a) and (b) are side views illustrating an example in which the bracket main body and the base portion are separately provided.

As illustrated in (a) of FIG. 10, the bracket 1 may have a structure in which the bracket main body 10 and the base portion 40 are separately formed and connected by electric welding or the like (see (b) of FIG. 10).

In this case, the bracket main body 10 is prepared as a standard product while the base portion 40 is prepared as a customized component adapted to each tooth of a patient, and the bracket 1 can thereby have high productivity and excellent attaching workability as compared with a method of customizing a bracket for each patient, such as by performing additional processing or disposing a filler on the attachment surface 40a side.

As described above, according to the embodiments, there can be provided the brackets for orthodontics 1, 1B, and 1C that allow the shutter or shutters 20 to be reliably opened/closed and fixed with a simple structure in the self-ligation type. Thus, according to the embodiments, the wire W can be easily and reliably attached and fixed, and it is possible to improve the workability of doctors and reduce the treatment time and the burden on patients.

The embodiments and specific examples have been described above, but the present invention is not limited to these examples. For example, the curved shape of the stopper wire 30 illustrated in FIG. 6 and FIG. 7 is not limited to the approximately M shape, and the stopper wire 30 may be curved in an appropriate shape with consideration for ease of pressing and opening/closing the first shutter 20A and the second shutter 20B. The scope of the present invention encompasses those to which a person skilled in the art appropriately makes addition or removal of constitutional elements or design changes with respect to the previously-described embodiments or specific examples and those in which features of the embodiments are appropriately combined, provided that they have the subject matters of the present invention.

What is claimed is:

1. A bracket for orthodontics, comprising:
a bracket main body, having a slot for attaching a wire and an introduction port adjacent to the slot;
a shutter, provided between the slot and the introduction port, so as to be movable forward and backward; and
a stopper wire, attached to the bracket main body to prevent detachment of the shutter,
wherein
the stopper wire has elasticity,
both end portions of the stopper wire are held by the bracket main body, and
a central portion of the stopper wire is disposed at a position that obstructs a forward/backward movement path of the shutter in a state in which the shutter is closed,
wherein an opening direction of the introduction port is orthogonal to a forward/backward movement direction of the shutter,
wherein the bracket main body has a recessed portion configured to fit a tip portion of the shutter thereinto;
wherein the stopper wire is provided, so that the central portion is located at a rear end of the shutter.

2. The bracket for orthodontics according to claim 1, wherein
the central portion of the stopper wire is provided so as to press an end portion of the shutter by the elasticity of the stopper wire.

3. The bracket for orthodontics according to claim 2, wherein
the central portion of the stopper wire is provided so as to be out of the forward/backward movement path of the shutter while being in contact with the shutter in a state in which the shutter is opened.

4. The bracket for orthodontics according to claim 3, wherein
the bracket main body has an inner guide wall and an outer guide wall that form the slot and the introduction port and face each other,
the outer guide wall has a through hole in which the shutter is inserted, and
the shutter is provided with a detachment prevention device that prevents the shutter from detaching from the through hole when the shutter inserted in the through hole is opened.

5. The bracket for orthodontics according to claim 2, wherein
the bracket main body has an inner guide wall and an outer guide wall that form the slot and the introduction port and face each other,
the outer guide wall has a through hole in which the shutter is inserted, and
the shutter is provided with a detachment prevention device that prevents the shutter from detaching from the through hole when the shutter inserted in the through hole is opened.

6. The bracket for orthodontics according to claim 1, wherein
the central portion of the stopper wire is provided so as to be out of the forward/backward movement path of the shutter while being in contact with the shutter in a state in which the shutter is opened.

7. The bracket for orthodontics according to claim 6, wherein
the bracket main body has an inner guide wall and an outer guide wall that form the slot and the introduction port and face each other,
the outer guide wall has a through hole in which the shutter is inserted, and
the shutter is provided with a detachment prevention device that prevents the shutter from detaching from the through hole when the shutter inserted in the through hole is opened.

8. The bracket for orthodontics according to claim 1, wherein
- the bracket main body has an inner guide wall and an outer guide wall that form the slot and the introduction port and face each other,
- the outer guide wall has a through hole in which the shutter is inserted, and
- the shutter is provided with a detachment prevention device that prevents the shutter from detaching from the through hole when the shutter inserted in the through hole is opened.

9. A bracket for orthodontics, comprising:
- a bracket main body, having:
- a first slot for attaching a first wire,
- a first introduction port adjacent to the first slot,
- a second slot for attaching a second wire, and
- a second introduction port adjacent to the second slot;
- a first shutter, provided between the first slot and the first introduction port, so as to be movable forward and backward;
- a second shutter, provided between the second slot and the second introduction port, so as to be movable forward and backward; and
- a stopper wire, attached to the bracket main body to prevent detachment of the first shutter and the second shutter, wherein
- a forward/backward movement path of the first shutter and a forward/backward movement path of the second shutter are provided so as to cross each other in a crossing area,
- the stopper wire has elasticity,
- both end portions of the stopper wire are held by the bracket main body, and
- a central portion of the stopper wire is disposed in the crossing area in a state in which the first shutter and the second shutter are closed.

10. The bracket for orthodontics according to claim 9,
- wherein a first opening direction of the first introduction port is orthogonal to a first forward/backward movement direction of the first shutter,
- wherein a second opening direction of the second introduction port is orthogonal to a second forward/backward movement direction of the second shutter,
- wherein the bracket main body has a first recessed portion configured to fit a tip portion of the first shutter thereinto,
- wherein the bracket main body has a second recessed portion configured to fit a tip portion of the second shutter thereinto.

* * * * *